Jan. 9, 1940.   D. M. ANDERSON   2,186,160
EJECTING MEANS FOR THERMOPLASTIC MOLDS
Filed Nov. 13, 1936   4 Sheets-Sheet 1

INVENTOR.
DWIGHT M. ANDERSON
BY
HIS ATTORNEY.

Jan. 9, 1940.   D. M. ANDERSON   2,186,160
EJECTING MEANS FOR THERMOPLASTIC MOLDS
Filed Nov. 13, 1936   4 Sheets-Sheet 2

INVENTOR.
DWIGHT M. ANDERSON
BY
His ATTORNEY.

Jan. 9, 1940.　　　　D. M. ANDERSON　　　　2,186,160
EJECTING MEANS FOR THERMOPLASTIC MOLDS
Filed Nov. 13, 1936　　　4 Sheets-Sheet 4

INVENTOR.
DWIGHT M. ANDERSON
BY
HIS ATTORNEY.

Patented Jan. 9, 1940

2,186,160

UNITED STATES PATENT OFFICE 2,186,160

EJECTING MEANS FOR THERMOPLASTIC MOLDS

Dwight M. Anderson, Cleveland Heights, Ohio, assignor, by mesne assignments, to The Standard Products Company, Port Clinton, Ohio, a corporation of Ohio Application November 13, 1936, Serial No. 110,569

8 Claims. (Cl. 18—42)

This invention relates to an ejection device for ejecting molded articles from mold cavities and particularly to a device of this character for use in connection with injection type molds for the production of articles from thermoplastic materials.

Heretofore in molds of this general character, suitable knock out or ejecting pins have been provided for freeing the article from the mold cavity when the mold blocks or sections are separated. Usually such knock out means or ejecting pins are provided in each section of the mold so that if the article adheres to the upper section, one set of pins may be operated to free the article from that section and the other set may be operated to free the article from the lower section if the article remains in the lower section.

Again, in injection type molds considerable difficulty has been encountered in the clogging of the sprue or gate leading to the mold cavity, a residue of thermoplastic material often remaining in the sprue after removal of the molded article, and blocking the sprue so that it is necessary to remove the die plates and clean the sprue passages before subsequent use.

One of the principal objects of the present invention is to provide one or more knock out or ejecting pin devices in one of the mold blocks only which is double acting in its operation so as to remove the article from both mold sections.

A correlative object is to provide an ejecting pin device which will remove the molded article from both sections of the mold and suspend the article in the space between the separated sections so that the article is readily accessible to the operator for complete removal.

Another object is to provide an ejecting device so arranged with relation to the mold sprue passage and gate that the plastic material in the heretofore remaining sprue and the gate after each molding operation is completely removed therefrom concurrently with the removal of the completed article from the cavity.

Still another object is to provide a pocket so associated with the sprue and gate that the material initially injected into the sprue and consequently partially hardened or congealed into an obstructing slug is diverted and retained from the path of succeeding plastic material so that only material at the proper plasticity is introduced into the gate and mold cavity.

Another object is to provide a means for ejecting the article from the mold caviety through the medium of the gate or sprue material.

Another object is to provide a location for the gate with respect to the article being molded whereby the portion of the article adjoining the gate is readily accessible for finishing and polishing.

Another object is to provide a mold in which both the sprue passage and the cooperating ejecting means may be individually removed from their associated mold blocks and readily replaced without disassembling the mold and mold plates from the platens and without disturbing the alignment of the mold blocks.

Other objects and advantages will become apparent from the following specification wherein reference is made to the drawings in which.

Figure 1:
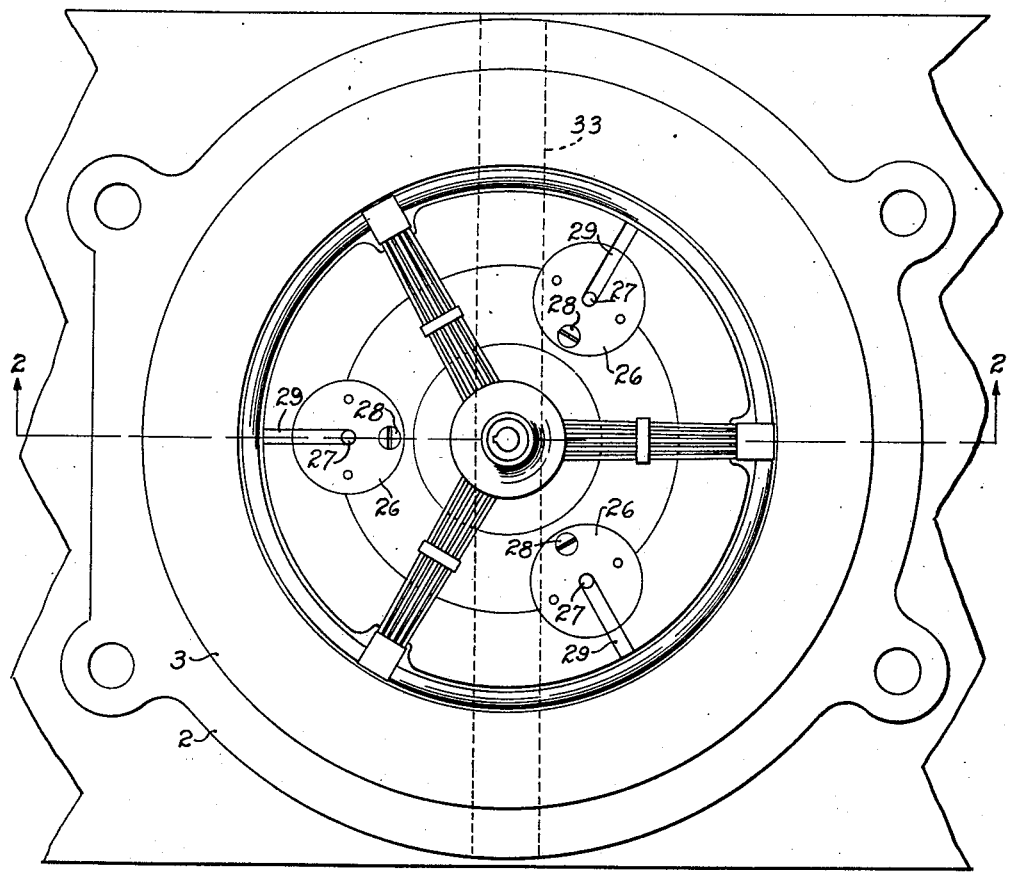
Fig. 1 is a plan view of a lower mold section and the molded article, and is taken at the parting line of the mold.
Figure 5:
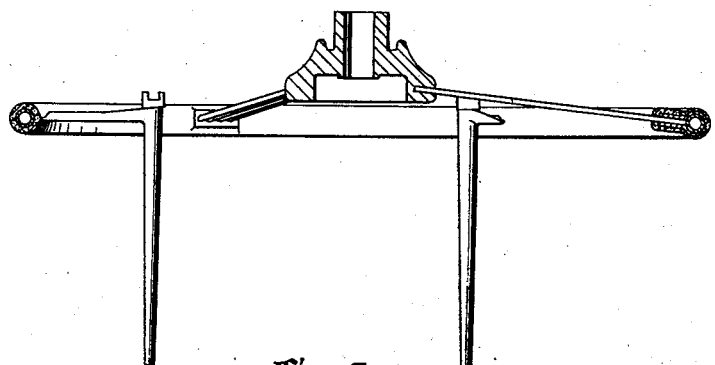
Figs. 5 and 6 are sectional views of the molded articles formed in the molds of Fig. 1 and Fig. 4 respectively.

Referring to the drawings, the present invention is illustrated in connection with the molding of automobile steering wheels having a rim annulus covered with thermoplastic material, its use in connection with die casting and other molding operations being readily apparent therefrom.

Figure 2:
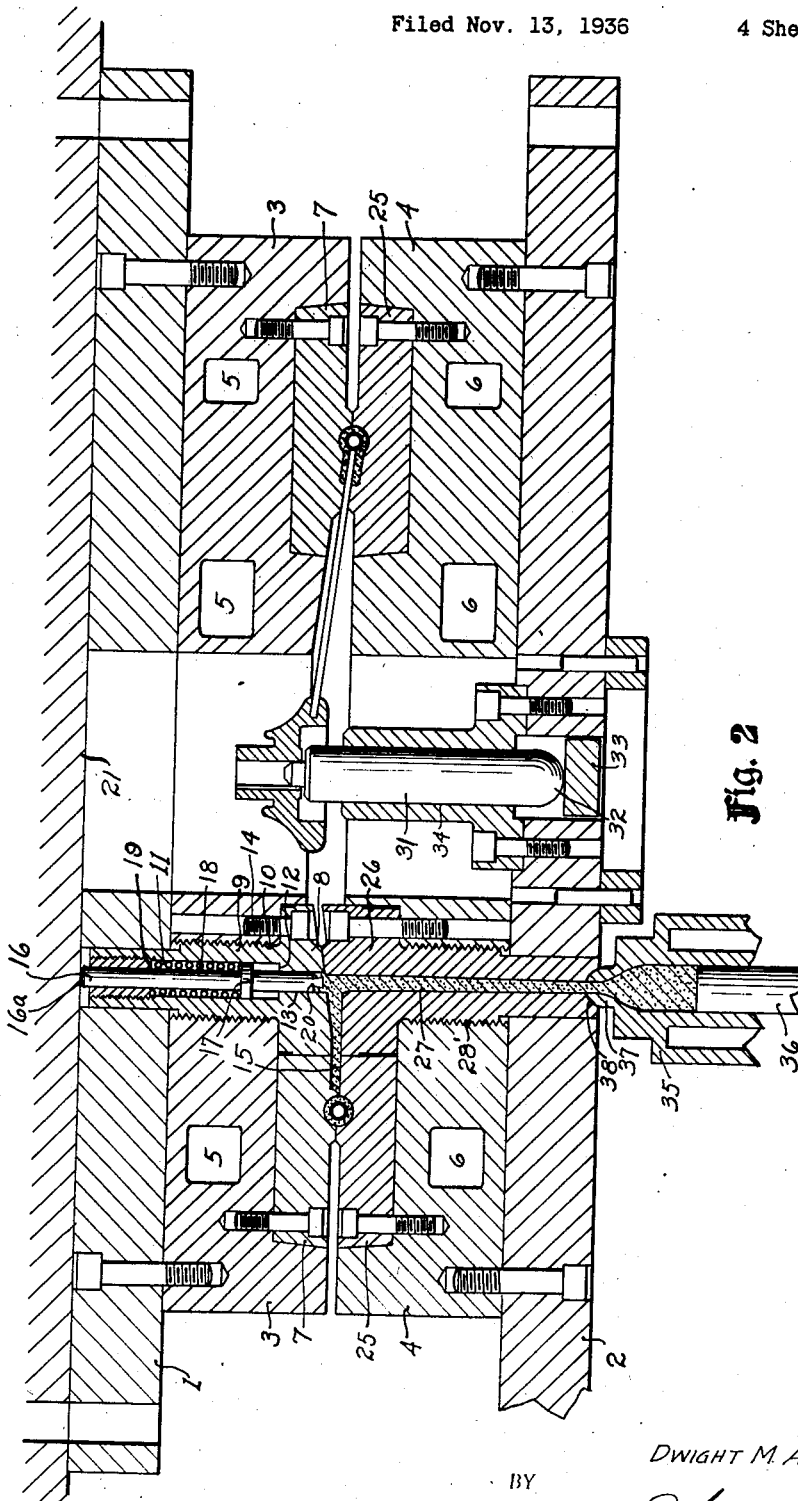
Fig. 2 is a vertical sectional view through the cooperating mold sections in closed position with the article being molded therein, and is taken along a plane indicated by the line 2—2 of Fig. 1.
Figure 3:
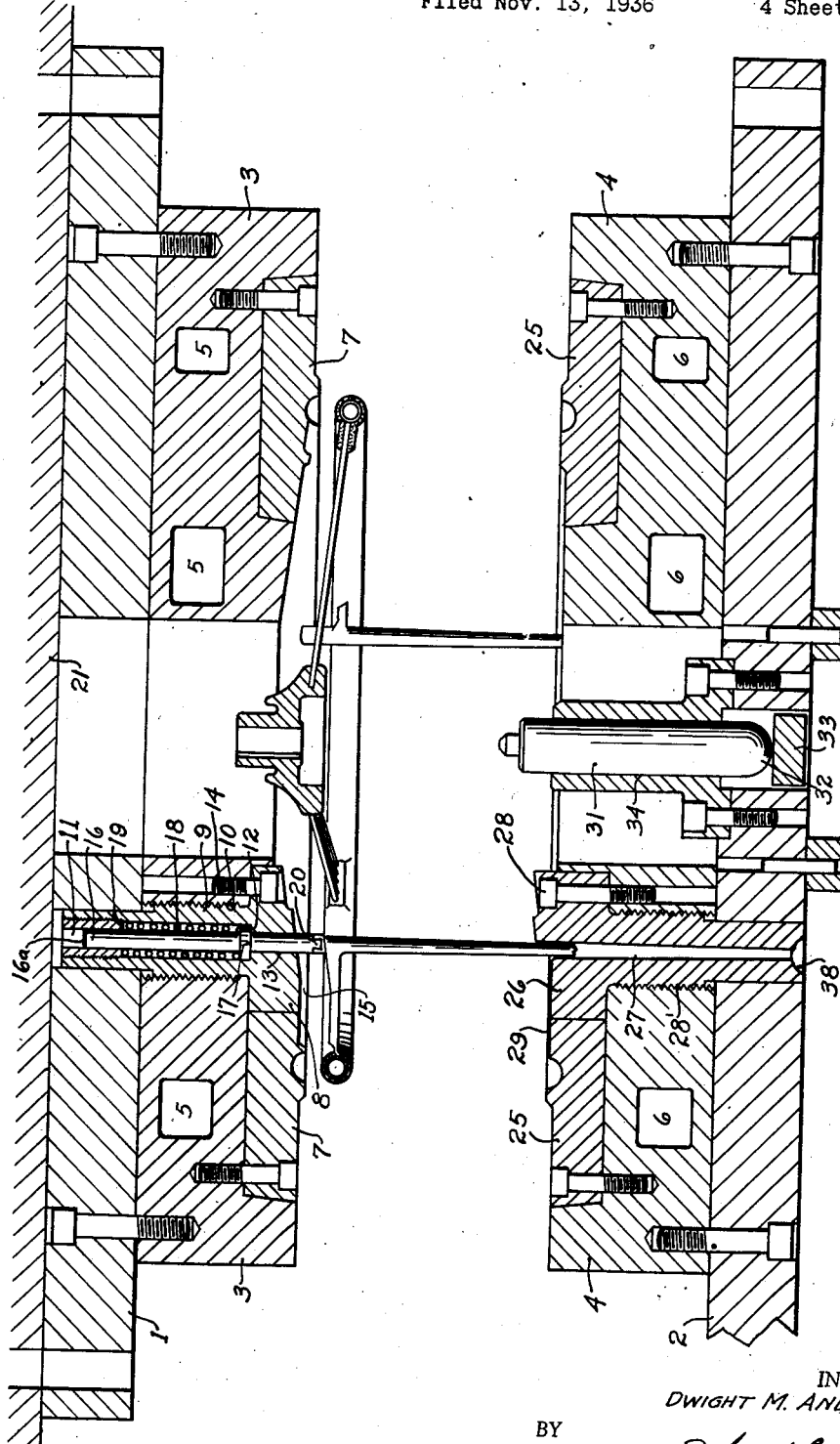
Fig. 3 is a vertical sectional view, similar to Fig. 2, wherein the mold blocks are separated and the molded article withdrawn and ejected from both the mold sections by the ejection device.

The mold shown for purposes of illustration comprises an upper mold platen 1 and a lower mold platen 2, the platens 1 and 2 being arranged for movement together under pressure and for separation as illustrated in Figs. 2 and 3 respectively. Carried on the platens 1 and 2 respectively are mold sections 3 and 4, each mold section being provided with internal passages, such as indicated at 5 and 6 respectively so that the sections may be heated or cooled as desired. Thus two separable mold sections are provided.

Referring specifically to the upper section of the mold, there is carried on the mold section 3 a suitable hardened and finished die plate 7 having thereon a portion of the cavity defining the particular article being molded, the die plate 7 being rigidly yet removably secured to the section 3 by suitable bolts as illustrated.

The ejection device of the present invention, in the form illustrated, is mounted in the section 3 and comprises a hardened metallic housing insert having a cylindrical head portion 8 and an externally threaded cylindrical portion 9 of smaller diameter connected thereto. The section 3 is provided with a suitable bore 10 having threads complementary to the threaded portion 9 of the housing insert so that the housing may be firmly screwed into place in the section 3. A smaller coaxial opening is provided in the platen 1 for accommodating a reduced diameter shank portion on the housing. The housing in turn is provided with an internal axial bore 11 extending from the upper end thereof substantially the length of the portion 9 and terminating inwardly of the housing in an annular abutment shoulder or stop 12. A smaller coaxial bore 13 extends from the bore 11 through the inner face of the portion 8 of the housing. The housing is screwed firmly into place in the section 3 so as to form substantially a part thereof and in this condition the housing insert and section 3 are each suitably drilled to receive a set screw or locking screw 14 which securely fastens the housing in position in the section 3.

Formed in the under face of the die plate 7 and portion 8 is a gate or passage 15 leading from the bore 13 to the cavity, thus producing a continuous passage for the material between bore 13 to the mold cavity.

Mounted in the bore 11 is a suitable ejecting pin 16 having an abutment 16a on one end thereof and a suitable shoulder 17 intermediate the ends, which abutment and shoulder cooperate with a pressure plate 21 and the shoulder 12 respectively for limiting the movement of the ejecting pin 16 toward and away from the parting line of the mold. The ejecting pin 16 is normally held downwardly by a suitable spring 18 reacting between the shoulder 17 and a suitable stationary abutment 19 formed within the bore 11. The shoulder 17 is so arranged with relation to the ejecting end of the ejecting pin 16 that the ejecting end is disposed outwardly beyond the plane of the portion 8 of the housing when the shoulder 17 rests against the shoulder 12.

This relation is preferably such, for the particular article being molded, that when the ejecting pin 16 is in the full ejecting position the article will be fully removed from the mold cavity and positioned a sufficient distance below the die plate 7 that it is readily accessible for complete removal by the operator, as shown in Fig. 3. The lower or ejecting end of the ejecting pin 16 is provided with a dove tail or undercut portion 20 which is formed by cutting back the end portion of the pin along its outer marginal limits, thus providing an overhanging end portion.

The lower section of the mold corresponds to the upper section except that the ejector or knock out device above described is not provided. Preferably the lower mold section 4 carries a die plate 25 and detachable members 26, each member 26 having a central passage 27 therein providing a sprue through which the thermoplastic material is forced. The members 26 correspond in external configuration to the housings for the ejecting pins 16 and are likewise suitably threaded as indicated at 28' for cooperation with complementary internal threads in the section 4. Each member 26 is likewise removable from the section 4 and is shaped for screwing into place so that the member 26 becomes a flush associated portion of the die plate 25. When finally machined to the desired configuration at the mold parting line, the member 26 and section 4 are drilled to receive a set screw or bolt 28 so that upon removal or replacement of the element 26 the exact alignment desired can be immediately obtained. The die plate 25 is provided with the cooperating portion of the mold cavity and both the plate 25 and member 26 are provided with a depression 29 which, when the mold is closed, forms the remainder of the gate 15.

The member 26 is positioned within the mold section 4 so that the sprue passage 27 is coaxial with the ejecting pin 16 and also with the bores 11 and 13. As a result, when the mold sections are brought together and closed preparatory to injecting the thermoplastic material into the cavity, this material initially flows through the sprue passage 27 and directly impinges the end 20 of the ejecting pin 16 and forces the pin upwardly into a retracted position within the bore 13. The material initially entering the passage 27 is partially chilled and unless diverted from the path of the passage 27 and gate 15 it might clog the passage. If this partially chilled material is immediately diverted from the passage and gate, the succeeding material, which is more plastic, is given a free and unobstructed passage into the cavity. It has been found that the initial material is often so congealed that it will not turn abruptly and flow properly through the gate.

As before recited, however, the pin 16 is resiliently held seated by a compression spring so that the end 20 of the pin may recede an appreciable distance into the bore 13. Consequently when the material initially introduced through the sprue reaches the gate, instead of turning into the gate, it engages the end of the pin 16 forcing the pin upwardly into retracted position within the bore 13 until the abutment 16a strikes the pressure plate 21. The material follows the pin into a pocket defined by the bore 13 and the end 20 of the ejecting pin 16 and is pressed firmly around the dove tail portion 20 of the pin. Thus the partially chilled material is removed from the path of the succeeding material flowing through the sprue and also removed from the confines of the gate so that only fluid material in the properly heated and plastic condition enters the gate and the mold cavity.

Due to the injection pressure on the material the pin 16 is forced and retained in its retracted position thereby so long as the mold sections are closed and the injection pressure maintained. This closed condition of the mold sections and the pressure on the material is maintained until the thermoplastic material has solidified within the sprue, gate and cavity sufficiently for removal. Upon separation of the mold sections the spring 18 urges the end 20 of the pin 16 below the parting line of the die plate 7 an appreciable distance, this distance being such that when the upper mold section is removed entirely from the lower mold section the article is completely freed and suspended below the upper mold section as shown in Fig. 3. If the article tends to stick to the lower die plate 25 it will be lifted therefrom, together with the gate and sprue, by virtue of the temporary attachment of the material in the bore 13 which is molded about the dove tail 20. In actual operation, the article usually remains in the lower mold section until the end 20 of the pin 16 is in the outermost ejecting position. Upon continued separation of the mold sections, the article is lifted clear of the lower section and the material in the sprue passage 27 and gate 15 is separated and removed from the passage 3 whereupon the mold is ready for repeating the operation.

In order to assist in the removal of the article from the lower section of the mold a central knock out pin 31 may be provided, this pin, for purposes of illustration, engaging the hub of the steering wheel and is capable of moving the wheel axially upwardly. Since the knock out pin 31 is usually operated by a cross bar extending beneath and transversely of the lower platen 2, one end 32 of the knock out pin 31, which is engaged by a kick out bar 33, is preferably hemispherical, as illustrated, or cylindrical, so that in event the kick out bar 33 is lifted unevenly on its opposite ends the bar can rock relative to the pin 31 without causing binding of the pin within its guideways 34.

In injection molding of articles from thermoplastic materials, the forming of the article is usually effected by means of an injection cylinder 35 in which a piston 36 operates for ejecting the material from the cylinder through a suitable nozzle 37. The nozzle 37 is accurately shaped on the end to fit tightly in a complementary cavity 38 at the entrance of the sprue passage, as illustrated in Figs. 2 and 3.

Since the material in the discharge portion of the nozzle 37, during the separation of the mold blocks, is relatively fluid or plastic, the separation of the mold sections withdraws the material from the sprue passage together with any slight amount of relatively soft material that may remain in the discharge end of the nozzle 37. Thus, the nozzle is sufficiently clean after each operation to assure proper continued operation.

In the event any of the ejecting pins 16 become damaged for any reason, or any sprue passage becomes clogged, it is unnecessary to disassemble the mold and recondition and reassemble the same. Instead, the mold sections may be separated and the bolts 14 and 28 respectively removed, whereupon the damaged ejecting device or the members 9 or 26 which may have clogged injection passages may be quickly repaired and replaced and the operation immediately continued.

From the above description it will be seen that the article is removed from the mold cavity without any part of the finished article having been subjected to the marring effects of the usual knock out or ejecting device and at the same time the sprue passage and gate are completely cleared after each operation and the article is suspended between the mold sections where it may be grasped where desired by the operator and removed from the mold.

For separating the material from the dove tail 20 of the ejecting pin 16 it is necessary only to slightly tilt or twist the finished article so that those portions of the material molded about the dove tail 20 will expand slightly and fully release the ejecting pin.

In the illustrative example a plurality of such ejection devices and sprues are used, these devices being evenly distributed circumferentially of the wheel and each ejection device being arranged opposite an associated sprue. Likewise, the members 26 are provided and uniformly distributed about the circumference of the rim. In the molding of smaller articles, however, only one such ejecting device and sprue may be effectively employed.

Figure 4:
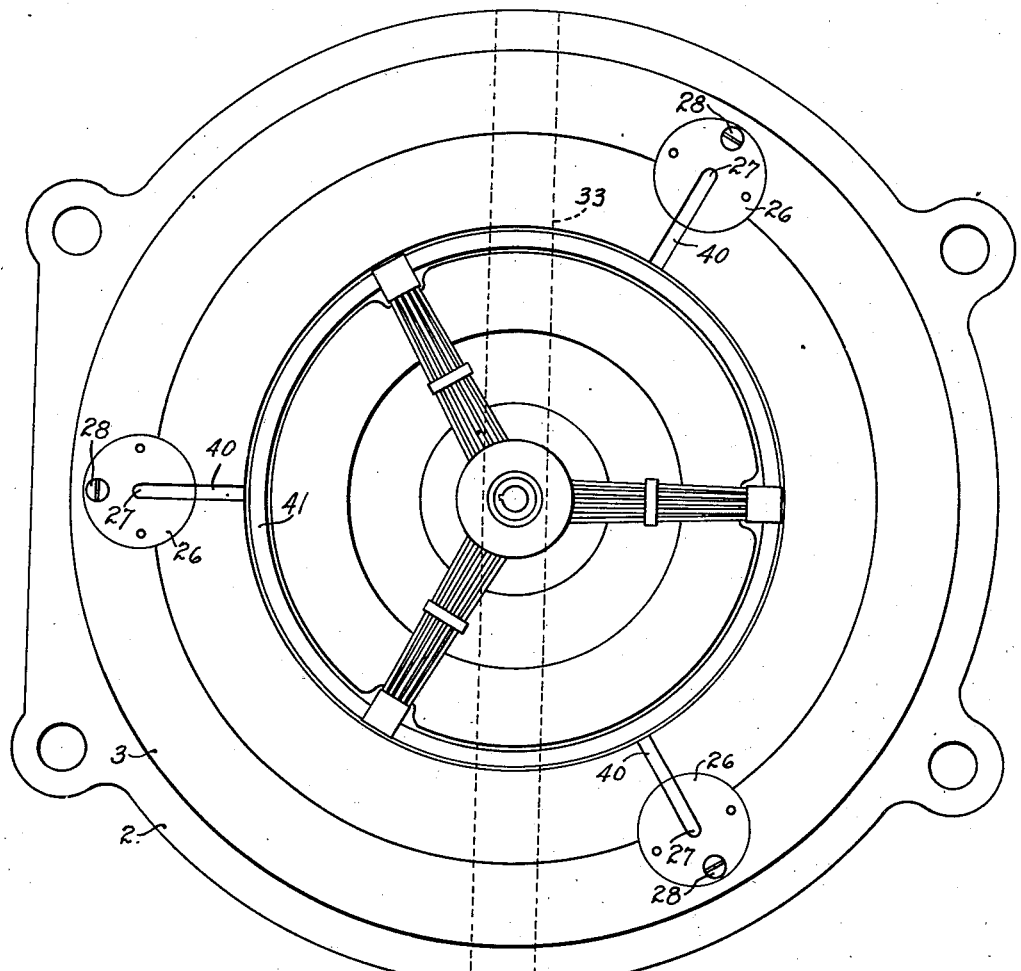
Fig. 4 is a plan view, similar to Fig. 1, illustrating a modification of the invention.
Figure 6:
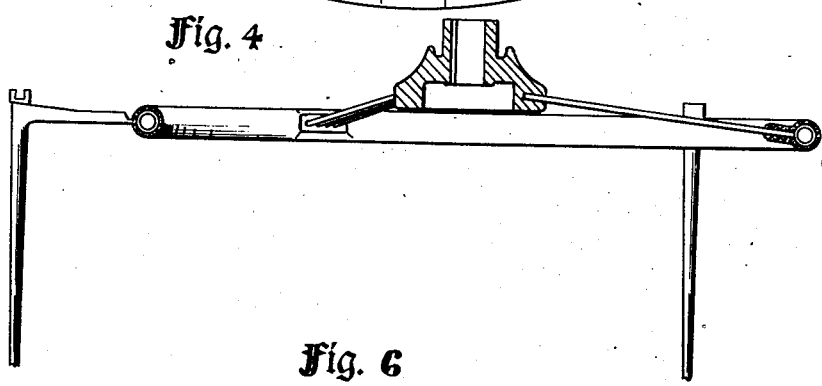

In Figs. 1 to 3 the gate is shown as extending from a position within the steering wheel rim annulus to a position radially outwardly thereto. In articles such as steering wheels molded in this manner it is often difficult to polish the annulus, at its point of juncture with the gate, to the required finish, after removal of the gate from the finished article, because only a small space is permitted for access between adjacent spokes. In such instances it is desirable, as illustrated in Fig. 4, to position the sprues radially outwardly beyond the rim annulus, the ejecting pin being correspondingly positioned. Thus, in Fig. 4, the gate 40 extends from the outside toward the rim 41 of the steering wheel so that the juncture of the rim and gate are at the radially outward surface of the finished wheel and are readily accessible for polishing and buffing.

Although only two forms of the present invention have been herein shown and described it will be apparent to those skilled in the art that other forms may be made without departing from the spirit and scope as defined in the appended claims.

Having thus described my invention, what I claim is:

1. A mold having separable sections with recesses in the engaging faces defining a cavity, a sprue passage in one of said mold sections substantially normal to the plane of the engaging face, gate means connecting the sprue passage and cavity for admitting material to be molded into the cavity, said gate means lying along the parting line of the mold sections, a bore in the other mold section substantially aligned with said sprue passage and opening into the engaging face of the said other mold section, a retractable article ejecting pin mounted for axial movement in said bore, an operating end on the pin adjacent the bore opening, said pin being movable into a retracted position in the bore wherein the operating end of the pin is positioned inwardly of said bore from the engaging face, and into an extended position wherein said end portion of the pin is disposed beyond the engaging face of the associated mold section, said pin having a portion exposed to material admitted into the bore and configured so that the material molds onto the pin for tying the material to the pin for movement therewith in opposite directions relative to both mold sections, whereby material initially entering the sprue passage enters said bore and therein molds into intimate contact with the end portion of the retracted pin and is thereby attached to the pin for movement therewith.

2. A mold having separable sections with recesses in the engaging faces defining a cavity, a sprue passage in one of said mold sections substantially normal to the plane of the engaging faces, gate means connecting the sprue passage and cavity for admitting material to be molded into the cavity, said gate means lying along the parting line of the mold sections, a bore in the other mold section substantially aligned with said sprue passage and opening into the engaging face of the said other mold section, a retractable article engaging pin mounted for axial movement in said bore, an operating end on the pin adjacent the bore opening, said pin being movable into a retracted position wherein the operating end portion of the pin is positioned inwardly of said bore from the engaging face, and into an extended position wherein said operating end portion of the pin is disposed beyond the engaging face of the associated mold section, means yieldably urging the pin toward extended position, said pin being moved into and held in retracted position by the material initially entering the sprue passage, said operating end portion being exposed to material while in said bore and configured so that the material molds onto the pin for tying the material to the pin for movement therewith in opposite directions relative to both mold sections.

3. A mold for forming articles of thermoplastic material comprising separable mold sections, recesses in the engaging faces of the sections defining an article forming cavity, a sprue passage through one of the mold sections and directed substantially normal to and opening into the engaging face of the associated mold section, a gate passage connecting the sprue opening and the cavity and directed substantially parallel to the engaging faces of the sections, a bore in the other mold section having an opening at the engaging face of said other section at the intersection of the sprue and gate, said bore being substantially axially aligned with the sprue passage, an ejecting pin mounted for axial movement in said bore, an undercut portion on the end of the pin adjacent the engaging face of said other section, yieldable means normally urging said ejecting pin to extend beyond the engaging face of said other section, a stop on said pin limiting the extended position of the pin, said pin being capable of being retracted within said bore, and a pocket defined by a portion of the bore and the undercut portion of the pin for receiving the initial portion of thermoplastic material injected into the mold.

4. A mold having separable sections, the adjacent faces of which are relatively recessed to define a cavity for molding plastic material which is capable of being solidified in the cavity, a bore in one of said sections communicating with said cavity and extending substantially normal to the separation plane of the mold sections, an ejector member slidably movable in said bore, said member having an end portion with surfaces shaped to interlock with an adjacent portion of the material as it solidifies, abutment means on the ejector member and cooperating abutment means in said bore to limit outward movement of the member from the mold section which carries it, whereby, upon relative separation of the mold sections, the molded piece can be retained by the ejector member in a predetermined spaced relation to the section which carries said member.

5. A mold having two separable sections which are relatively recessed at their adjacent faces to define a mold cavity and a gate portion leading to the mold cavity, a sprue passage in one mold section substantially normal to the plane of one of said adjacent faces and communicating with the gate portion, an ejecting pin retractably carried by the other mold section, an end portion of the pin being in substantial alignment with the sprue passage and exposed to material passing therefrom toward the gate portion of the cavity, and yielding means tending to urge the pin into extended position toward the sprue passage, whereby the flow of material through the sprue passage tends to force the pin away from said passage by stressing the yielding means.

6. An injecting type mold having separable mold sections which cooperate to form a mold cavity for molding plastic material which is capable of being solidified, one of the sections having a passage transverse to the separation plane of the mold sections for receiving injected material, a second passage connecting said first mentioned passage with said cavity for flowing the material toward the cavity, an ejecting means movably carried on the other section and positioned to have a surface portion exposed to the material in said first mentioned passage and so configured as to interlock with said material when the same solidifies thereagainst, said ejecting means being capable of movement relative to the mold section which carries it and toward said first mentioned passage, and means limiting said movement, whereby, when the mold sections are separated a predetermined distance greater than the maximum movement of the ejecting means, the ejecting means can cause the molded article to be freed from said mold sections.

7. A mold having two separable sections which are relatively recessed at adjacent faces to form a cavity for plastic material capable of being solidified and passages communicating with the cavity through which material flows to the cavity, an ejector movably carried on one section for movement normal to the parting plane of the sections, said ejector being positioned to have a portion exposed to the material flowing to the cavity and so shaped as to interlock with the material, spring means reacting on the ejector and the section which carries the ejector and constantly tending to force the ejector toward the other section for automatically ejecting the work from said one section upon initial separation of the sections, and means to limit the movement of the ejector in the direction it is forced by the spring so that upon predetermined further separation of the sections the ejector can operate through the interlock to draw the work from the other section.

8. A mold having separable sections, the adjacent faces of which cooperate to form a mold cavity for molding plastic material capable of being solidified, one of the sections having a relatively small passage in communication with said cavity, so shaped that the material when solidified in the passage can be withdrawn readily therefrom, the axis of the passage being transverse to the separation plane of the mold sections and the passage being positioned to intercept a portion of the material flowing to the cavity so that material to be molded in the cavity can flow into the passage, an ejector pin slidable axially in the passage and normally disposed in position therein so that one end of the pin is exposed to the material flowing into said passage, the pin being movable outwardly of the passage upon separation of the sections and having a reduced tongue on its said end so configured as to interlock with material which enters and solidifies in the passage on each side of the tongue, whereby the molded article can be separated from the pin by spreading the solidified material transversely of the tongue.

DWIGHT M. ANDERSON.